US010511613B2

(12) United States Patent
Chen et al.

(10) Patent No.: US 10,511,613 B2
(45) Date of Patent: Dec. 17, 2019

(54) KNOWLEDGE TRANSFER SYSTEM FOR ACCELERATING INVARIANT NETWORK LEARNING

(71) Applicant: NEC Laboratories America, Inc., Princeton, NJ (US)

(72) Inventors: Zhengzhang Chen, Princeton Junction, NJ (US); LuAn Tang, Pennington, NJ (US); Zhichun Li, Princeton, NJ (US); Chen Luo, Houston, TX (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/055,675

(22) Filed: Aug. 6, 2018

(65) Prior Publication Data
US 2018/0351971 A1    Dec. 6, 2018

Related U.S. Application Data

(63) Continuation-in-part of application No. 15/413,812, filed on Jan. 24, 2017, now Pat. No. 10,333,815.

(60) Provisional application No. 62/543,050, filed on Aug. 9, 2017.

(51) Int. Cl.
*H04L 29/06* (2006.01)
*H04L 12/24* (2006.01)

(52) U.S. Cl.
CPC ........ *H04L 63/1408* (2013.01); *H04L 41/024* (2013.01); *H04L 41/0631* (2013.01); *H04L 41/12* (2013.01); *H04L 41/16* (2013.01); *H04L 63/1433* (2013.01)

(58) Field of Classification Search
CPC ....... H04L 41/06–41/065; H04L 41/14–41/16; H04L 41/22
See application file for complete search history.

(56) References Cited

U.S. PATENT DOCUMENTS

| 9,202,144 B2 | 12/2015 | Wang et al. |
| 9,208,432 B2 | 12/2015 | Buibas et al. |
| 9,223,617 B2 | 12/2015 | Singh et al. |

(Continued)

OTHER PUBLICATIONS

Chen Luo, et al. TINET: Learning invariant networks via knowledge transfer. In Proceedings of the 24th ACM SIGKDD International Conference on Knowledge Discovery & Data Mining (KDD'18). 1890-1899. Aug. 23, 2018.*

*Primary Examiner* — Brendan Y Higa
(74) *Attorney, Agent, or Firm* — Joseph Kolodka

(57) ABSTRACT

A computer-implemented method for implementing a knowledge transfer based model for accelerating invariant network learning is presented. The computer-implemented method includes generating an invariant network from data streams, the invariant network representing an enterprise information network including a plurality of nodes representing entities, employing a multi-relational based entity estimation model for transferring the entities from a source domain graph to a target domain graph by filtering irrelevant entities from the source domain graph, employing a reference construction model for determining differences between the source and target domain graphs, and constructing unbiased dependencies between the entities to generate a target invariant network, and outputting the generated target invariant network on a user interface of a computing device.

20 Claims, 8 Drawing Sheets

(56) References Cited

U.S. PATENT DOCUMENTS

2012/0265507 A1* 10/2012 Carbajales ........... G06Q 10/067
          703/6
2014/0122422 A1* 5/2014 Tzadikevitch ...... G06F 16/1748
          707/610
2015/0227849 A1 8/2015 Jaros et al.

* cited by examiner

KNOWLEDGE TRANSFER SYSTEM FOR ACCELERATING INVARIANT NETWORK LEARNING

RELATED APPLICATION INFORMATION

This application claims priority to Provisional Application No. 62/543,050, filed on Aug. 9, 2017, and U.S. patent application Ser. No. 15/413,812 filed on Jan. 24, 2017, the contents of which are incorporated herein by reference in their entirety.

BACKGROUND

Technical Field

The present invention relates to enterprise networks and, more particularly, to implementing a knowledge transfer system for accelerating invariant network learning.

Description of the Related Art

The latent behavior of an information system that can exhibit extreme events, such as system faults or cyber-attacks, is complex. Recently, the invariant network has shown to be a powerful way of characterizing complex system behaviors. Structures and evolutions of the invariance network, in particular, the vanishing correlations, can shed light on identifying causal anomalies and performing system diagnosis. However, due to the dynamic and complex nature of real-world information systems, learning a reliable invariant network in a new environment often requires continuous collecting and analyzing the system surveillance data for several weeks or even months. Although the invariant networks learned from old environments have some common entities and entity relationships, these networks cannot be directly borrowed for the new environment due to the domain variety problem.

SUMMARY

A computer-implemented method for implementing a knowledge transfer based model for accelerating invariant network learning is presented. The method includes generating an invariant network from data streams, the invariant network representing an enterprise information network including a plurality of nodes representing entities, employing a multi-relational based entity estimation model for transferring the entities from a source domain graph to a target domain graph by filtering irrelevant entities from the source domain graph, employing a reference construction model for determining differences between the source and target domain graphs, and constructing unbiased dependencies between the entities to generate a target invariant network, and outputting the generated target invariant network on a user interface of a computing device.

A system for implementing a knowledge transfer based model for accelerating invariant network learning is presented. The system includes a memory and a processor in communication with the memory, wherein the processor is configured to generate an invariant network from data streams, the invariant network representing an enterprise information network including a plurality of nodes representing entities, employ a multi-relational based entity estimation model for transferring the entities from a source domain graph to a target domain graph by filtering irrelevant entities from the source domain graph, employ a reference construction model for determining differences between the source and target domain graphs, and construct unbiased dependencies between the entities to generate a target invariant network, and output the generated target invariant network on a user interface of a computing device.

A non-transitory computer-readable storage medium comprising a computer-readable program for implementing a knowledge transfer based model for accelerating invariant network learning is presented, wherein the computer-readable program when executed on a computer causes the computer to perform the steps of generating an invariant network from data streams, the invariant network representing an enterprise information network including a plurality of nodes representing entities, employing a multi-relational based entity estimation model for transferring the entities from a source domain graph to a target domain graph by filtering irrelevant entities from the source domain graph, employing a reference construction model for determining differences between the source and target domain graphs, and constructing unbiased dependencies between the entities to generate a target invariant network, and outputting the generated target invariant network on a user interface of a computing device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the invention provide TINET, a knowledge transfer based model for accelerating invariant network construction. In particular, an entity estimation model is employed to estimate the probability of each source domain entity that can be included in the final invariant network of the target domain. Then, a dependency construction model is employed for constructing the unbiased dependency relationships by solving a two-constraint optimization problem.

Figure 1:
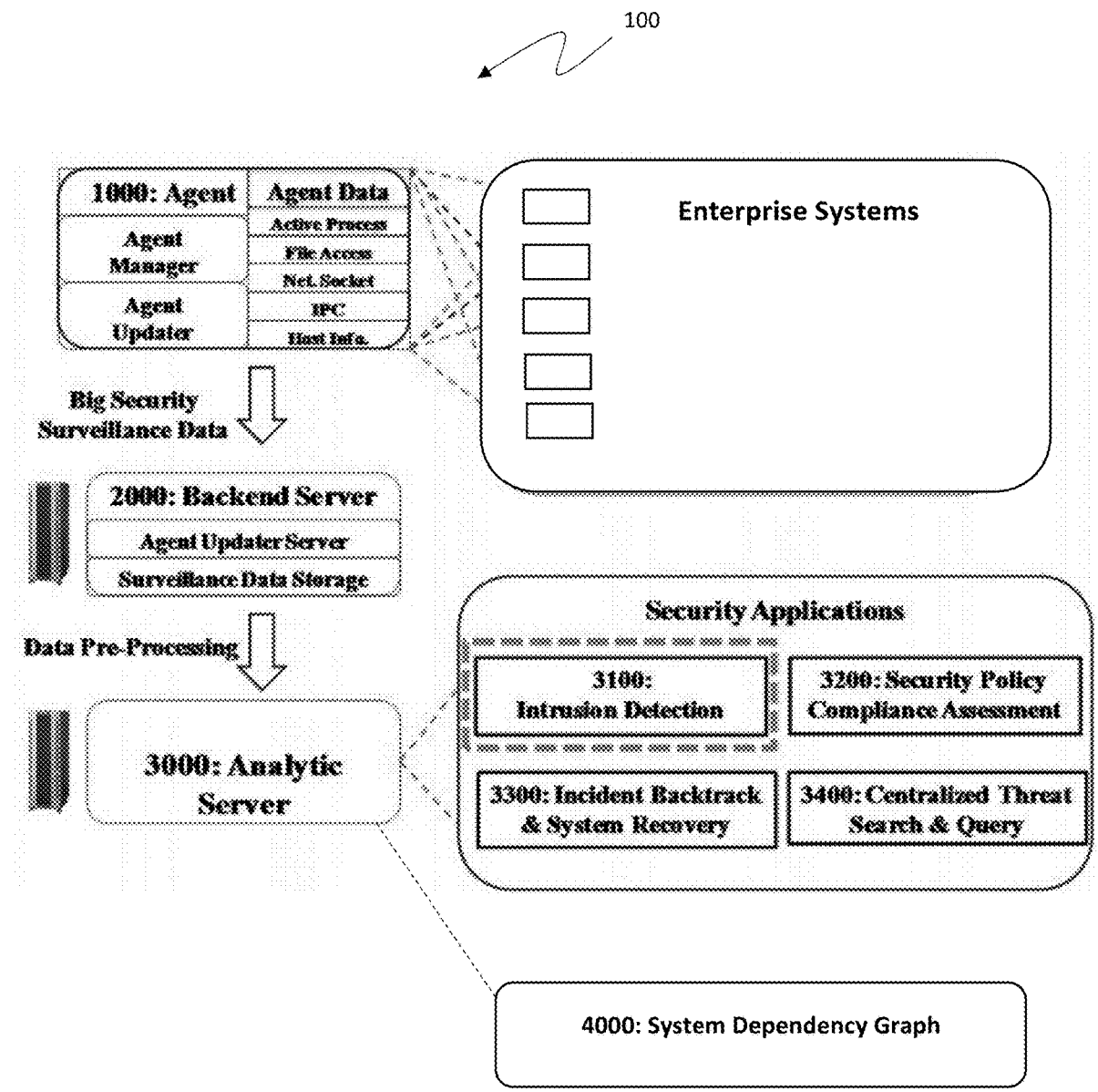
FIG. 1 is an example architecture of an automatic security intelligence system, in accordance with embodiments of the present invention.

FIG. 1 shows the overall architecture 100 of the Automatic Security Intelligence (ASI) system. The components are: agent 1000 installed in each host of the enterprise network to collect operational data, backend servers 2000 that receive the data from agents, pre-process them, and send such processed data to the analysis server, analysis server 3000, which runs the security application programs to analyze the data, and the system invariant network. The intrusion detection engine 3100 is an application for detecting any possible intrusion from sources inside/outside the enterprise network.

The analysis server 3000 runs the security application programs to analyze the data. The system invariant network 4000 component automatically and incrementally constructs a system blueprint with confidence to holistically profile the whole system. It is necessary to many forensic analysis applications, such as intrusion detection, incident backtrack and system recovery, etc. Such technique is integrated in the system invariant network construction.

Figure 2:
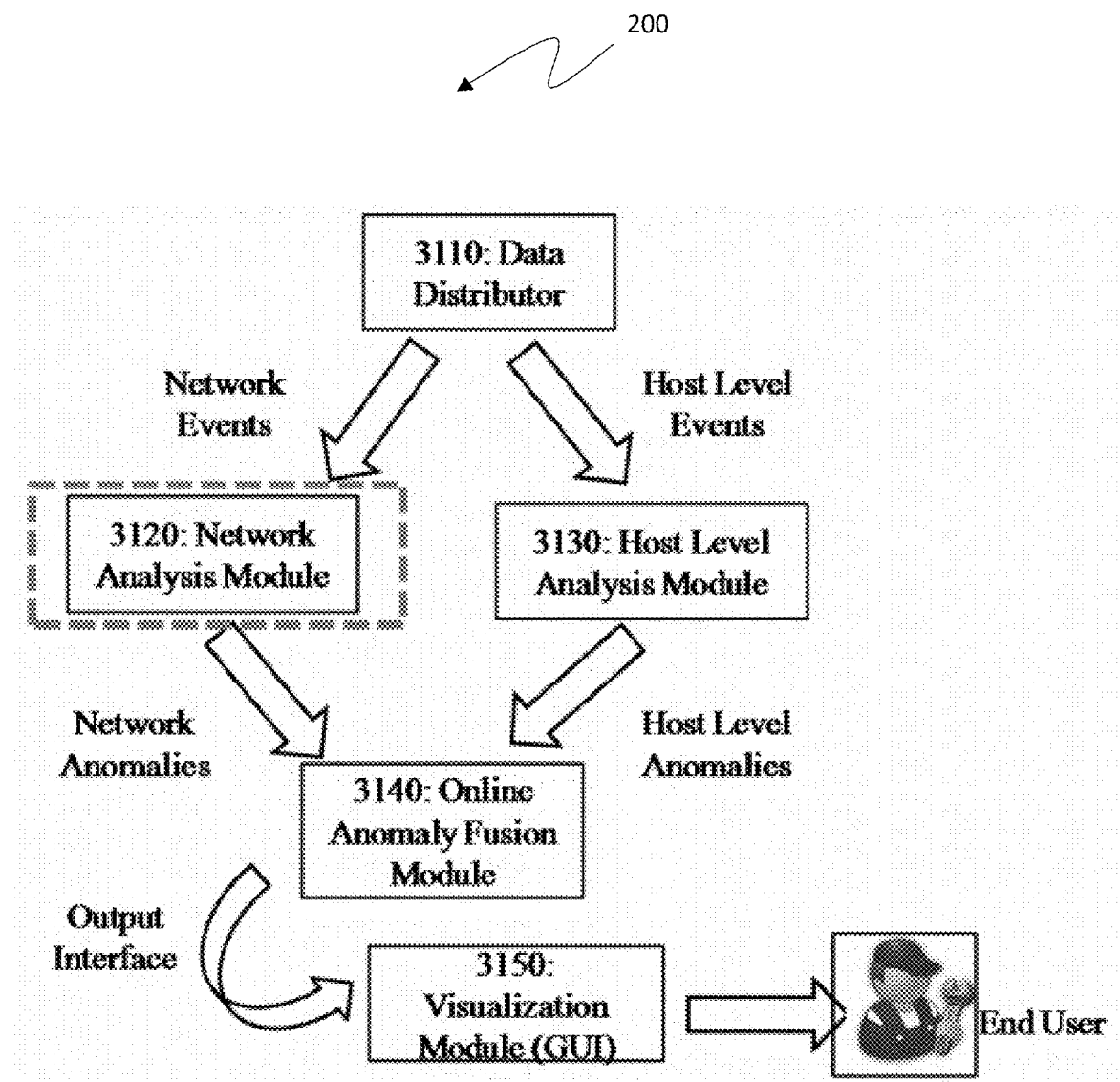
FIG. 2 is an example architecture of an intrusion detection engine, in accordance with embodiments of the present invention.

FIG. 2 shows the architecture 200 of an intrusion detection engine. There can be five modules in the engine.

The data distributor 3110 that receives the data from the backend server and distributes the corresponding data to a network or host level modules.

The network analysis module 3120 that processes the network connection events (including TCP (transmission control protocol) and UDP (user datagram protocol)) and detects the abnormal connections.

The host level analysis module 3130 that processes the host level events, including user-to-process, process-to-file, user-to-registry, etc. The abnormal host level events are then generated.

The anomaly fusion module 3140 that integrates the network and host level anomalies and refines the results for trustworthy intrusion events.

The visualization module 3150 that outputs the detection results to end users. The technique of this invention serves as the main part of network analysis module 3120.

Figure 3:
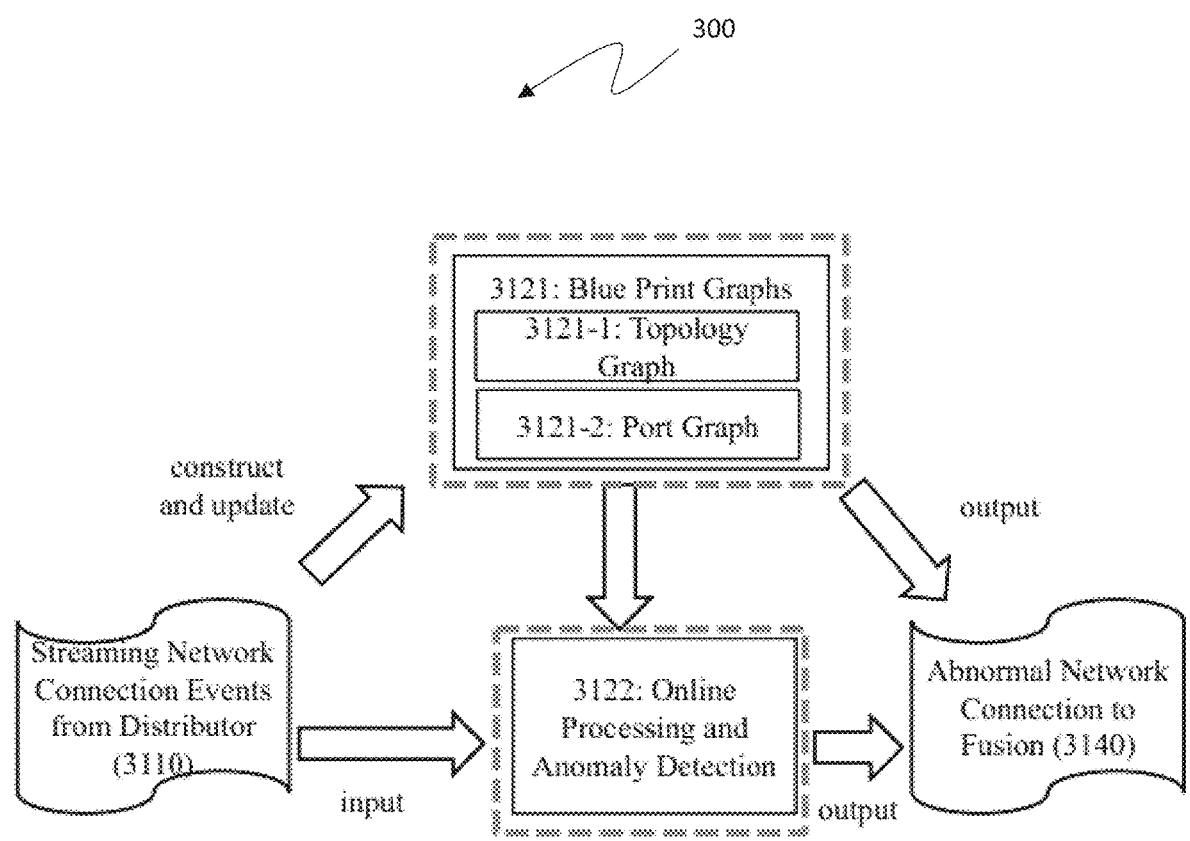
FIG. 3 is an example architecture of a network analysis module, in accordance with embodiments of the present invention.

FIG. 3 illustrates the architecture 300 of the network analysis module. There are the following components: the blue print graph model 3121, which is a relationship model constructed and updated on the streaming network connection events from 3110, and the online processing component that takes the network connections as input, conducts analysis based on the blue print graphs, and outputs the detected abnormal network connections to 3140.

Figure 6:
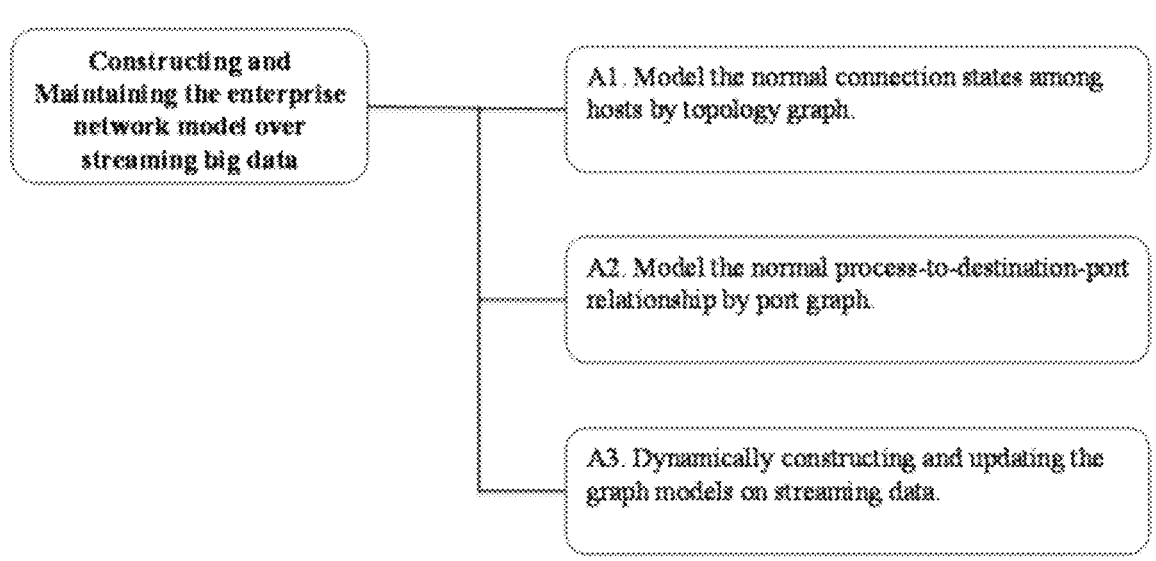
FIG. 6 is a block/flow diagram illustrating a method of implementing a blue print graph model, in accordance with embodiments of the present invention.

The following issues can be resolved by employing 3121 and 3122:

How to construct a model to profile the normal states of an enterprise network?(Solved by 3121; FIG. 6)

Figure 7:
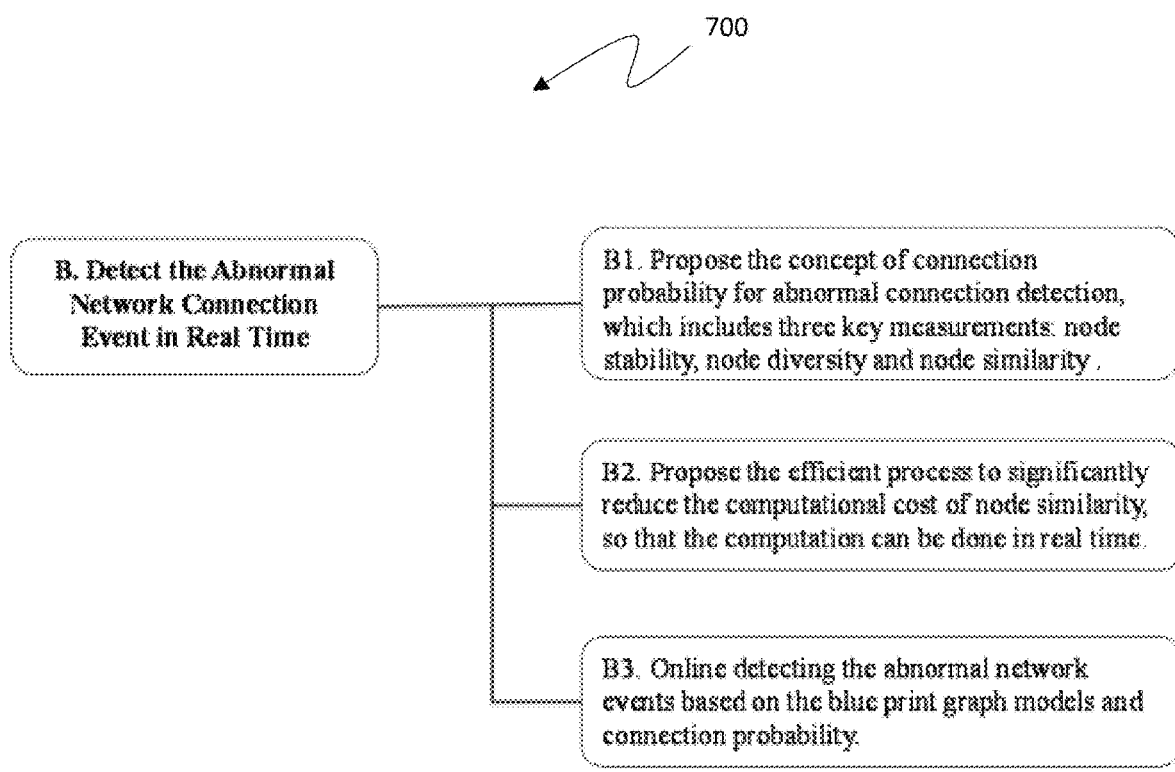
FIG. 7 is a block/flow diagram illustrating a method of detecting abnormal network connections, in accordance with embodiments of the present invention.

How to detect the abnormal network connections based on the normal state model?(Solved by 3122; FIG. 7)

Constructing and maintaining the enterprise network model over streaming big data (3121) is now described. A flowchart 600 (FIG. 6) summarizes such process.

The ASI agents are installed on the hosts of the enterprise network, and the ASI agents collect all the network connection events and send them to the analysis server.

A network event contains the following information.

Concerning network events: A network connection event e is a 7-tuple, e=<src_ip, src_port, dst_ip, dst_port, connecting_process, protocol_num, timestamp>, where src_ip and src_port are the IP address and port of the source host, dst_ip and dst_port are the IP and port of the destination host, connecting_process is the process that initializes the connection, protocol_num indicates the protocol of the connection, and timestamp records the connection time.

Note that the ASI agent is a light-weight software. To reduce the workload and maintain privacy, the agent does not collect the content and traffic size of the network connections. Such information is thus not available for the system to analyze.

In a first example, Table 1 below illustrates a list of network event samples from 11:30 am to 12:05 am in 2016 Feb. 29. These network events can be classified to two (2) categories based on the dst_ip: if the dst_ip is in the range of enterprise network's IP addresses (138.15.xx.xx), the network event is an inside connection between two hosts of the enterprise network. If the dst_ip is not in the range, it is an outside connection between an internal host and an external host.

In Table 1 below, $e_1$, $e_3$, $e_5$ and $e_6$ are inside connections and $e_2$ and $e_4$ are outside connections.

TABLE 1

List of Network Events

| Event | Src_ip | Src_port | Dst_ip | Dst_port | Process | Protocol | Timestamp |
|---|---|---|---|---|---|---|---|
| $e_1$ | 138.15.165.26 | 19820 | 138.15.165.226 | 445 | ntoskrnl.exe | 17 (UDP) | 2016-2-29 11:30:12 |
| $e_2$ | 138.15.165.32 | 1672 | 74.125.228.17 | 80 | chrome.exe | 6 (TCP) | 2016-2-29 11:35:09 |
| $e_3$ | 138.15.165.40 | 1823 | 138.15.165.235 | 445 | ntoskrnl.exe | 17 (UDP) | 2016-2-29 11:40:56 |
| $e_4$ | 138.15.165.27 | 621 | 101.125.228.17 | 80 | chrome.exe | 6 (TCP) | 2016-2-29 11:52:19 |
| $e_5$ | 138.15.165.28 | 8203 | 138.15.165.226 | 445 | ntoskrnl.exe | 17 (UDP) | 2016-2-29 12:02:09 |
| $e_6$ | 138.15.165.41 | 7625 | 138.15.165.235 | 445 | ntoskrnl.exe | 17 (UDP) | 2016-2-29 12:04:23 |

After analyzing large amounts of real connection events in enterprise networks, the following observations can be made:

Observation 1: The dst_ips of outside connections are quite diverse, however, the dst_ips of inside connections are regular and exhibit one or more patterns. For example, the hosts belonging to the same group all connect to the private servers of the group, and they rarely connect to other groups' private servers.

Observation 2: For both inside and outside connections, there is a binding relation on the process and the dst_port. For example, chrome.exe is used to load web pages and it usually connects to the dst_ports 80 and 8080. The ntoskrnl.exe is used for windows network neighbor discovery and it always connects to the dst_port 445.

Based on the above observations, two data structures are introduced to model the normal states of connection events in the enterprise network. The blue print graph of topology (topology graph) is used to model the source and destination relationship of the connection events inside the enterprise network. The blue print graph of process-destination-port (port graph) is used to model the relationship between process and destination ports of all the network connections.

Concerning the Topology Graph: The topology blue print graph $G_t=<V, E>$, where V is the node set of hosts inside the enterprise network and E is the edge set. A host node v is a 3-tuple, v=<host_id, ip, last_connection_time>; an edge l is a 4-tuple, l=<edge_id, src_ip, dst_ip, last_connection_time>.

The last_connection_time records the timestamp of the latest network connection on the node/edge. This measurement is used to update the blue print graphs. If a node/edge has no connection event for quite a long time (e.g., 2 months), the system removes such a node/edge to keep the blue print graphs up-to-date.

In the topology graph, if there is a new network connection between a pair of hosts inside the enterprise network, an edge is constructed between these two host nodes. The last_connection_time of both nodes and edges are updated as the timestamp of the connection event. Note that the topology graph does not store the total count of connection events between a pair of nodes. Since the ASI agent does not monitor the contents and traffic of the network connections, the total count of connection is not meaningful and can be misleading. In real applications, many normal processes may initialize thousands of network connection events in one second via the same edge. A large number of the total count does not indicate high traffic on the edge.

Concerning the Port Graph: The port blue print graph $G_p=<V_p, V_d, E>$, where $V_p$ is the node set of processes that initialize the connection, $V_d$ is the node set of the destination port, and E is the edge set. A process node $v_p$ is a 2-tuple, $v_p$=<process, last_connection_time>; a destination port node $v_d$ is a 2-tuple, $v_d$=<port, last_connection_time>; and an edge l is a 4-tuple, l=<edge_id, process, port, last_connection_time>.

The port graph is a bipartite graph. In this graph, a process node can only connect to port nodes, and vice versa. The source of the edge is always defined as the process, and the destination of the edge is always defined as the port.

In the port graph, an edge may be constructed from a source process to a destination port based on the new connection event. The last_connection_time of both nodes and edges are updated as the timestamp of the connection event.

The first process summarized below illustrates the steps used to construct and update both graphs over the streaming data. For each new connection event, the system first checks whether the topology graph contains the source and destination host nodes, and adds the nodes if they are not contained (Steps 1 to 2). Then the system checks the edge existence between the pair of host nodes and adds a new edge if there is no edge between both nodes (Steps 3 to 4). Then, the last_connection_time of the edge and nodes are updated based on the event's timestamp (Step 5). The steps of updating the port graph are similar (Steps 6 to 12). Finally, the system removes outdated nodes and edges and returns the updated graphs (Steps 13 to 14). Note that this process is employed for both constructing the graph models and maintaining them up-to-date. The constructed blue print graphs can be saved in files and loaded by a different analysis engine.

For example, the users may construct the graphs from one enterprise network, and load the constructed graphs on the stream of another enterprise network. The process automatically updates the blue print graphs. It does not require the users to provide any specific information of the enterprise network. Hence, it is more feasible for system deployment in real applications. Process 1 can be given as follows:

| Process 1: Constructing and Updating Blue Print Graphs | |
|---|---|
| Input: | The new arrived network connection event e, the old topology graph $G_t$ and port graph $G_p$; |
| Output: | The updated topology graphs $G_t$ and $G_p$; |
| Step 1: | Check whether $G_t$ contains the host nodes with src_ip and dst_ip of e; |
| Step 2: | If $G_t$ does not contain the node(s), add the node(s) to $G_t$; |
| Step 3: | Check whether $G_t$ contains the edge between the nodes of src_ip and dst_ip of e; |
| Step 4: | If $G_t$ does not contain the edge, add a new edge to $G_t$; |
| Step 5: | Update the last_connection_time of the corresponding nodes and edges of $G_t$; |
| Step 6: | Check whether $G_p$ contains the process nodes about connecting_process of e; |
| Step 7: | If $G_p$ does not contain the process node, add the node to $G_p$; |
| Step 8: | Check whether $G_p$ contains the destination port nodes about dst_port of e; |
| Step 9: | If $G_p$ does not contain the destination port node, add the node to $G_p$; |
| Step 10: | Check whether $G_p$ contains the edge between the process and dst_port of e; |
| Step 11: | If $G_p$ does not contain the edge, add a new edge to $G_p$; |
| Step 12: | Update the last_connection_time of the corresponding nodes and edges of $G_p$; |
| Step 13: | Remove outdated nodes and edges from $G_t$ and $G_p$; |
| Step 14: | Return $G_t$ and $G_p$; |

Detecting abnormal network connections based on the blue print graphs is now described. A flowchart 700 (FIG. 7) summarizes such process.

Figure 4:
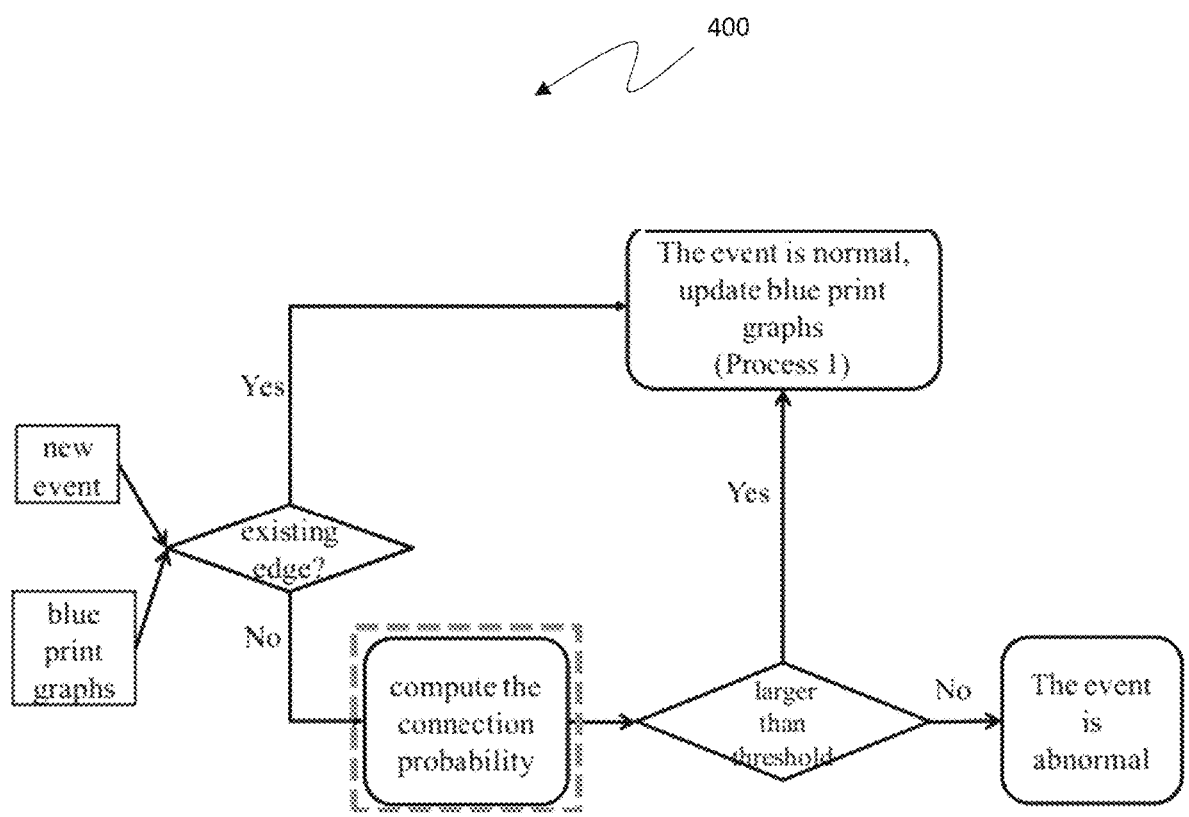
FIG. 4 is an example framework of an online anomaly detection component, in accordance with embodiments of the present invention.

The main usage of the blue print graph model is to detect abnormal network connections. FIG. 4 shows the framework of an online anomaly detection component 400. This component takes both blue print graphs and the new connection event as input. The system first matches the event to a blue print graph and checks whether the event is on an existing edge of the graph. If the event is on the existing edge, it means that a connection with the same topology/port information has been seen before, and such an event is normal. The system then updates the blue print graph based on this event. If the event cannot be matched to any edge, it means that the event has an unseen relationship. In such a case, the system needs to further compute the probability of this connection. If the probability is larger than a threshold, such an event is still normal and the system updates the blue print graph by adding a new edge based on the event. If the probability is low, it means that the connection is not likely to happen. Then, the system outputs the event as an abnormal connection.

There key factors in computing the connection probability for a new edge are: (1) whether the source or destination node always has new edges in previous periods (node stability); (2) whether the source or destination node has many edges already (node diversity); and (3) whether the source or destination has connected to a similar node before (node similarity).

In the blue print graphs, the nodes and edges are updated based on the arriving network connection events. After a while, some nodes always have new edges, but other nodes become stable with a constant number of edges. The following measure is employed to model the stability of a node.

Concerning Node Stability: Let v be a node in the blue print graph, and m be a fixed time window length. The time period, from v is added to the blue print graph to the current timestamp and can be partitioned to a sequence of time windows, $T=\{T_0, T_1, T_2, \ldots T_n\}$, where $T_i$ is a time window with length m. If there is no new edge from/to node v in window $T_i$, $T_i$ is defined as a stable window. The node stability is thus defined in Eqs. 1 and 2, where $|T_{from}'|$ is the count of stable windows in which no edge connects from v, $|T_{to}'|$ is the count of stable windows in which no edge connects to v, and $|T|$ is the total number of windows.

$$\sigma_{src}(v)=|T_{from}'|/|T| \qquad \text{Eq. 1}$$

$$\sigma_{dst}(v)=|T_{to}'|/|T| \qquad \text{Eq. 2}$$

There are two stability scores for each node, since a node that is not stable as a source may be stable as a destination. For example, a host may constantly have new edges from it, however, there is no other host that connects to it. In such a case, even the host has very low stability as a source and its stability score is very high as a destination. If there is suddenly a connection to this host, it is considered abnormal.

The range of node stability is [0,1], when a node has no stable window, i.e., the node always has new edges in every window, the stability is 0. If all the windows are stable, the node stability is 1.

In real applications, the window length is set to 24 hours (a day). Hence the stability of a node is determined by the days that the node has no new edges and the total number of days. Note that, the node stability can be easily maintained over the stream, the system only stores three numbers of $|T_{from}'|$, $|T_{to}'|$ and $|T|$ for each node, and updates in every 24 hours. The time complexity of computing node stability is O(1).

In the blue print graph, some nodes have many edges, e.g., a public server in the topology graph may have edges to hundreds of hosts. Thus, the probability is much higher for this node to have more new edges.

Concerning Node Diversity: Let v be a node in the topology graph, $E_{from}(v)$ be the set of edges that connect from v and $E_{to}(v)$ be the set of edges that connect to v, the node diversity is defined in Eqs. 3 and 4, where $|V|$ is the size of the node set in the topology graph.

$$\theta_{src}(v)=|E_{from}(v)|/(|V|-1) \qquad \text{Eq. 3}$$

$$\theta_{dst}(v)=|E_{to}(v)|/(|V|-1) \qquad \text{Eq. 4}$$

The range of node diversity in the topology graph is [0,1]. For a node without any edge, the diversity is 0, and if the node connects to every other node in the graph, the diversity is 1.

The port graph is a bipartite graph. For each edge in the port graph, the source is always a process node and the designation is always a port node. The process node diversity $\theta_{src}(v_p)$ and port node diversity $\theta_{dst}(v_d)$ are defined by Eqs. 5 and 6, where $|V_d|$ is the size of the port node set and $|V_p|$ is the size of the process node set.

$$\theta_{src}(v_p)=|E_{from}(v)|/|V_d| \qquad \text{Eq. 5}$$

$$\theta_{dst}(v_p)=|E_{to}(v)|/|V_d| \qquad \text{Eq. 6}$$

The range of node diversity in the port graph is also [0,1]. If a process connects to all the ports, or a port has connections from every process, the node diversity reaches the maximum as 1.

The node diversity can also be efficiently computed over the stream. The system stores a total number of edges from/to each node, and updates the number when a new edge is added to the graph. The time complexity of computing the node diversity is O(1).

Beside stability and diversity, the main factor of connection probability computation is the node similarity, which indicates whether the source/destination has connected to similar nodes before.

Concerning Node Similarity: Let $v_1$ and $v_2$ be two nodes of the same type in the blue print graph, dst(v) and src(v) denote the destinations/sources that have edges from/to v. The node similarity is defined as Eqs. 7 and 8.

$$\gamma_{src}(v_1, v_2) = \frac{dst(v_1) \cap dst(v_2)}{dst(v_1) \cup dst(v_2)} \qquad \text{Eq. 7}$$

$$\gamma_{dst}(v_1, v_2) = \frac{src(v_1) \cap src(v_2)}{src(v_1) \cup src(v_2)} \qquad \text{Eq. 8}$$

Note that, $v_1$ and $v_2$ must be the same type, i.e., they are both host nodes in the topology graph, or both are process nodes or port nodes in the port graph. The source similarity (Eq. 7) between the two nodes is indeed the Jaccard similarity of their destinations, and the destination similarity (Eq. 8) is the Jaccard similarity of the sources that have connected to both nodes. The range of node similarity is [0,1]. If both nodes have the same sources/destinations in the blue print graph, their similarity is 1, if they have no common source/destinations, the similarity is 0.

Based on the above three measures, the connection probability can be defined as follows.

Connection Probability: Let e be a new connection event, G be a blue print graph, $v_1$ and $v_2$ be source and destination nodes when matching e to G, the connection probability, p(e|G), is defined as shown in Eq. 9, where $\varphi_{src}(v_1)$, $\varphi_{dst}(v_2)$ are the source and destination abnormal scores of $v_1$ and $v_2$, which are computed in Eqs. 10 and 11.

$$p(e|G)=1-\max(\varphi_{src}(v_1),\varphi_{dst}(v_2)) \qquad \text{Eq. 9}$$

The abnormal score of source node $v_1$ is computed as shown in Eq. 10, where $\sigma(v_1)$ is the node stability, $\theta_{src}(v_1)$ is the node diversity and $dst(v_1)$ is the node set of destination that $v_1$ has connected to in the blue print graph G. Similarly, the abnormal score of destination node $v_2$ is computed in Eq. 11, where $src(v_2)$ is the source node set that has connection to $v_2$.

$$\varphi_{src}(v_1)=\sigma_{src}(v_1)*(1-\theta_{src}(v_1))*(1-\max_{v_j \in dst(v_1)}\gamma_{dst}(v_2, v_1)) \qquad \text{Eq. 10}$$

$$\varphi_{dst}(v_2)=\sigma_{dst}(v_2)*(1-\theta_{dst}(v_2))*(1-\max_{v_j \in src(v_2)}\gamma_{dst}(v_1, v_j)) \qquad \text{Eq. 11}$$

Note that the measure of node similarity is different from the measures of stability and diversity. The stability and diversity is defined on a single node, but the similarity is a score computed by comparing two nodes. In Eq. 10, the node similarity is compared between $v_2$ and every historical destination of $v_1$, and uses the maximum to compute the abnormal score. The intuition is that, if one can find one node that $v_1$ has connected in history with high similarity to $v_2$, then the connection probability between $v_1$ and $v_2$ is high.

Figure 5:
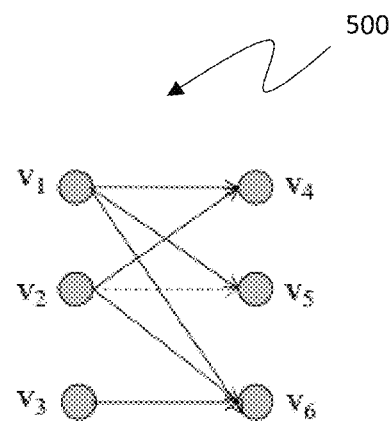
FIG. 5 is an example of node similarity, in accordance with embodiments of the present invention.

In a second example, as shown in FIG. 5, a small blue print graph 500 with six nodes is presented. The edge from node $v_2$ to $v_5$ is a new edge. To compute the abnormal score $\varphi(v_2)$, the system needs to check the node similarity between $v_5$ and the old destination nodes that $v_2$ has connected before ($v_4$ and $v_6$).

Based on Eq. 6, $\gamma_{dst}(v_4, v_5)=\frac{1}{2}=0.5$, $\gamma_{dst}(v_4, v_5)=\frac{1}{3}=0.33$.
$v_4$ is more similar to $v_5$ than $v_1$.

Thus, the system uses $\gamma_{dst}(v_4, v_5)$ to compute $\varphi(v_2)$.

Compared to node stability and node diversity, the computation cost of node similarity is much higher. Let n be the total number of nodes in the graph. In the worst case scenario, if every pair of nodes in the blue print graph are connected, the system has to check n−1 nodes for one round of comparison, and the comparison has to carry out for n−1 times, the total time complexity is $O(n^2)$.

In order to process such big streaming data, the computation of node similarity must be done in real time. Fortunately, the following theorem provides a way to significantly reduce the computation cost.

Let e be a new connection event, G be a blue print graph, $v_1$ and $v_2$ be source and destination nodes when matching e to G, the lower-bound of connection probability, $p_{low}(e|G)$, is defined as shown in Eq. 12, where $\varphi_{src}^{upp}(v_1)$, $\varphi_{dst}^{upp}(v_2)$ are the upper-bounds of $v_1$ and $v_2$'s abnormal scores, which are computed in Eqs. 13 and 14.

$$p_{low}(e|G)=1-\max(\varphi_{src}^{upp}(v_1),\varphi_{dst}^{upp}(v_2)) \quad \text{Eq. 12}$$

$$\varphi_{src}^{upp}(v_1)=\sigma_{src}(v_1)*(1-\theta_{src}(v_1)) \quad \text{Eq. 13}$$

$$\varphi_{dst}^{upp}(v_2)=\sigma dst(v_2)*(1-v_{dst}(v_2)) \quad \text{Eq. 14}$$

Proof: Since the node similarity score, $\gamma_{dst}(v_2, v_i)$ is in the value range of [0,1]. And $(1-\max_{v_i \in dst(v_1)}\gamma_{dst}(v_2, v_i))$ is still in the value range of [0,1].

$$\varphi_{src}(v_1)=\sigma_{src}(v_1)*(1-\theta_{src}(v_1))*(1-\max_{v_i \in dst(v_1)}\gamma_{dst}(v_2, v_i)) \leq \sigma_{src}(v_1)*(1-\theta_{src}(v_1))$$

Therefore, $\varphi_{src}^{upp}(v_1)=\sigma_{src}(v_1)*(1-\theta_{src}(v_1))$.

Similarly, it can be proved that $\varphi_{dst}^{upp}(v_2)=\sigma_{dst}(v_2)*(1-\theta_{dst}(v_2))$.

Note that, the node stability and diversity can be computed in O(1) time. Therefore, the system can efficiently compute the lower bound of connection probability $P_{low}(e|G)$ on streaming data. If $p_{low}(e|G)$ is larger than or equal to the given threshold, the connection event is definitely normal. The system can just let it go without further computation. Only when $p_{low}(e|G)$ is less than the given threshold, the system needs more detailed computation of $p(e|G)$ to further decide whether e is abnormal or not. Thus, the time cost is reduced significantly by adding a filter based on $p_{low}(e|G)$.

The second process shows the detailed steps of online anomaly detection. The system takes the connection event, two blue print graphs and a threshold of connection probability as input, and outputs the abnormal labels of the event. The system first matches the event to the topology graph, if the event is an existing edge, the topology abnormal label is false (e.g., the event is normal in topology perspective) (Steps 1 to 2). If the event is a new edge, the system computes the lower bound of connection probability, if the lower bound is already larger than or equal to the threshold, the topology abnormal label is still false (Steps 4 to 5). Only when the lower bound is less than the threshold, the system computes the connection probability and compares the result with the threshold. If the probability is larger than the threshold, the topology abnormal label is false, otherwise it is true (Steps 6 to 11). Finally, if the topology abnormal label is false, the system updates the topology graph based on this normal event (Step 12). Similarly, the system checks the event with the port graph to compute the abnormal port label (Steps 13 to 24). Finally, both labels are returned as output. Process 2 can be given as follows:

Process 2: Online Anomaly Detection

Input: The connection event e, the topology graph $G_t$ and port graph $G_p$, the connection probability threshold $\delta$
Output: The label of is_topology_abnormal(e), is_port_abnormal(e);
Step 1: Match e to topology graph $G_t$;
Step 2: If e is via an existing edge of $G_t$, is_topology_abnormal(e) ← false;
Step 3: Else
Step 4:   {Compute $p_{low}(e|G_t)$ based on Eq. 12;
Step 5:   If $p_{low}(e|G_t) \geq \delta$, is_topology_abnormal(e) ← false;
Step 6:   Else{
Step 7:     Compute$p(e|G_t)$ based on Eq.9;
Step 8:     If $p(e|G_t) \geq \delta$, is_topology_abnormal(e) ← false;
Step 9:     Else is_topology_abnormal(e) ← true;
Step 10:   }
Step 11: }
Step 12: If is_topology_abnormal(e) = false, update topology graph $G_t$ with e;
Step 13: Match e to port graph $G_d$;
Step 14: If e is via an existing edge of $G_d$, is_port_abnormal(e) ← false;
Step 15: Else
Step 16:   {Compute $p_{low}(e|G_d)$ based on Eq. 12;
Step 17:   If $p_{low}(e|G_d) \geq \delta$, is_ port _abnormal(e) ← false;
Step 18:   Else{
Step 19:     Compute $p(e|G_d)$ based on Eq.9;
Step 20:     If $p(e|G_d) \geq \delta$, is_ port _abnormal(e) ← false;
Step 21:     Else is_ port _abnormal(e) ← true;
Step 22:   }
Step 23: }
Step 24: If is_ port _abnormal(e) = false, update port graph $G_d$ with e;
Step 25: Return is_topology_abnormal(e), is_port_abnormal(e);

Dynamic information systems, such as cyber-physical systems, enterprise systems, and cloud computing facilities, are inherently complex. These large-scale systems usually include a great variety of components/entities that work together in a highly complex and coordinated manner. For example, the cyber-physical system is usually equipped with a large number of wireless sensors that keep recording the running status of the local physical and software components.

Recently, the concept of invariants has been employed to study complex systems. Such invariant models focus on discovering stable and significant dependencies between pairs of system entities that are monitored through surveillance data recordings, so as to profile the system status and perform subsequent reasoning. A strong dependency between a pair of entities is called an invariant relationship. By combining the invariants learned from all monitoring entities, a global system dependency profile can be obtained. The significant practical value of such an invariant profile is that it provides important clues on abnormal system behaviors, and in particular on the source of anomalies, by checking whether existing invariants are broken.

For fully utilizing the invariant model, the first prerequisite is to construct the invariant network from the system streaming data. In the invariant network, a node represents a system component/entity and an edge indicates a stable, significant interaction between two system entities. During the construction process, the network structure and invariant/dependency relations are inferred by continuously collecting and analyzing the surveillance data generated by the system.

Figure 8:
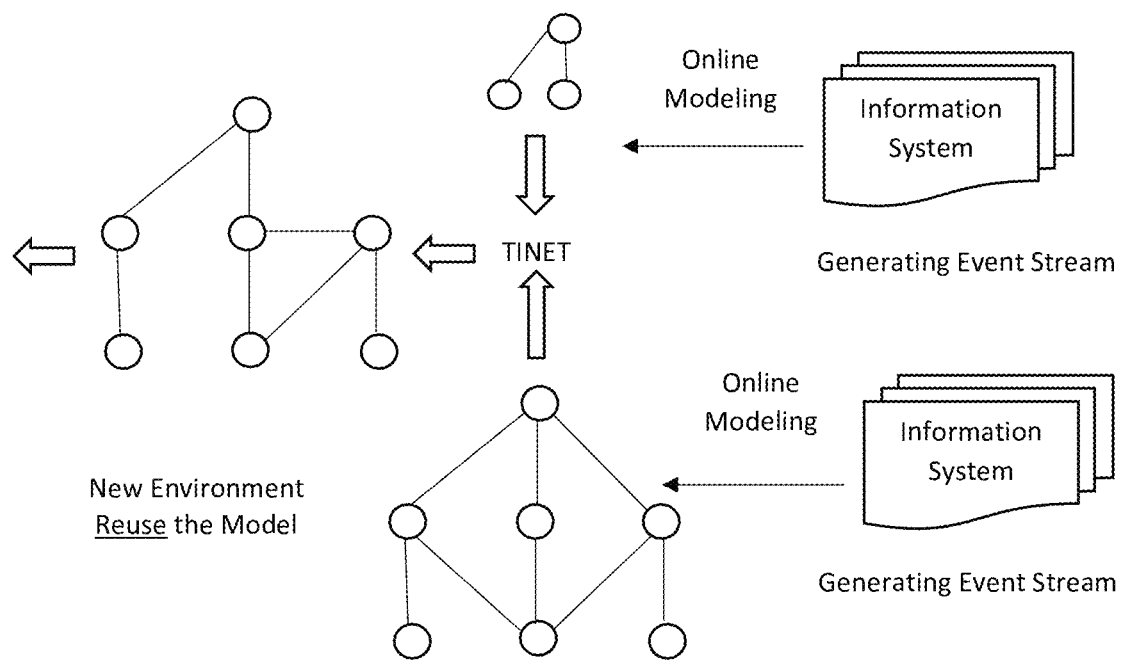
FIG. 8 is a block/flow diagram illustrating a TINET workflow of learning the invariant network, in accordance with embodiments of the present invention.

Due to the dynamic and complex nature of the real-world information system, learning a robust invariant network often requires a very long training time. For instance, in enterprise security systems (FIG. 8), the construction process needs to collect at least 30 days of streaming data to identify important entities and relationships reliably. However, it is often impractical and uneconomical to wait for such long time, especially for some mission-critical environments (e.g., nuclear plants) and PoC (Proof of Concept) scenarios. Unfortunately, utilizing fewer days' data will lead to an unreliable network with poor performance. Thus, to deploy the models reliably in a new environment, a user has to wait a long time (e.g., 30 days) before any reliable invariant network can be obtained.

Enlightened by the cloud services, one way to "speed up" the learning process is by reusing a unified invariant network model in different domains/environments. However, due to the domain/environment variety problem, directly applying the invariant network learned from an old environment to a new environment often cannot achieve good performance.

The good news is that it is easy and fast to compute a partial, significantly incomplete, invariant network of the new environment of interest. To avoid the prohibitive time and resource consuming network building process, the exemplary embodiments complete this partial information reliably by transferring knowledge from another invariant network. Formally, given a partial invariant network of the target domain and a complete invariant network of the source domain. How can a user reliably compute the full invariant network of the target domain?

There are two major challenges for achieving this:

Challenge 1: Identify the domain-specific/irrelevant entities between two environments. As aforementioned, since the environments are different, not all entities of the source domain are related to the target domain. For instance, an invariant network from an electronic factory system will have entities such as energy-related program, which will not exist in an information technology (IT) company enterprise system. Thus, a user needs to identify the right entities that can be transferred from the source domain to the target one.

Challenge 2: Constructing the invariant relationships on the new environment. After transferring the entities from source to target, a user also needs to identify invariant relationships between the entities to complete the invariant network. The challenge is to extract the invariant information from the old environment, and then combine this knowledge with the partial invariant network of the new environment.

To address the aforementioned two challenges, TINET is introduced, which is an efficient and effective method for transferring knowledge between Invariant Networks. TINET includes two sub-models: EEM (Entity Estimation Model) and DCM (Dependency Construction Model).

First, EEM filters out irrelevant entities from the source network based on entity embedding and manifold learning. Only the entities with statistically high correlations with the target domain are transferred. Then, after transferring the entities, DCM model effectively constructs invariant (dependency) relationships between different entities for the target network by solving a two-constraint optimization problem. The exemplary embodiments can use an existing invariant network of an old environment to complete the partial invariant network of the new environment. As a result, the costly time and resource consuming re-building process of the invariant network from scratch can be avoided.

The exemplary methods perform an extensive set of experiments on both synthetic and real-world data to evaluate the performance of TINET. The results demonstrate the effectiveness and efficiency of the novel algorithm. The exemplary methods also apply TINET to real enterprise security systems for intrusion detection. By using TINET, the exemplary methods can achieve more than 75% accuracy after 3 days of training time, and this performance is almost the same as 30 days of construction of invariant network without using TINET. On the contrary, building an invariant network employing only 3 days of data can only get about 10% accuracy. Thus, the exemplary methods can achieve superior detection performance at least 20 days lead-lag time in advance with more than 75% accuracy.

An invariant network is defined as an undirected weighted graph $G=\{V, E\}$, where $V=\{v1, \ldots, vn\}$ is the set of n heterogeneous system entities and $E=\{e_1, \ldots, e_m\}$ is the set of m edges between pairs of entities. The edges exist depending on whether there are invariant or dependency relationships between the corresponding pairs of system entities.

For example, in an enterprise security system, an invariant network is a graph between different computer system entities such as processes, files, and Internet sockets. The edges indicate the stable causal dependencies including a process accessing a file, a process forking another process, and a process connecting to an Internet socket.

Depending on the type of the collected system data, there are different ways to generate the invariant relationships/edges. For the time series data (e.g., sensor readings from a cyber-physical system), given two pairs of time series x(t) and y(t), where t is the timestamp, the relationship between x(t) and y(t) can be constructed by employing the AutoRegressive eXogenous (ARX) model. For the categorical event data (e.g., the process events from an enterprise system), a common system event can be presented as an edge between two nodes, each representing the initiator or the target of the interaction.

A network including all the invariant links is referred to as the invariant network. Constructing the invariant network from the system monitoring or surveillance data is referred to as the model training. After the training, the learned complete invariant network, as the system profile, can be applied to many autonomic system management applications such as anomaly detection, system fault diagnose, incident backtrack, and etc.

Given two environments/domains: a source domain $\mathcal{D}_S$ and a target domain $\mathcal{D}_T$, an information system has been running in $\mathcal{D}_S$ for a long time, while the same information system has only been deployed in $\mathcal{D}_T$ for a short period of time. Let $G_S$ be the well-trained invariant network constructed based on the collected data from $\mathcal{D}_S$. Let $\hat{G}_T$ be the partial/incomplete invariant network constructed based on the collected data from $\mathcal{D}_T$. The main goal is to transfer the knowledge from $G_S$ to help construct a complete invariant network $\overline{G}_T$ of the domain $\mathcal{D}_T$.

Invariant relationship and dependency can be used interchangeably, and for simplicity, source network (target network) can be used as the short name for the invariant network of the source domain (target domain).

The symbols used are listed in Table 2 below.

TABLE 2

List of symbols

| Notation | Description |
| --- | --- |
| $\mathcal{D}_S$ | The source donmain |
| $\mathcal{D}_T$ | The target domain |
| $G_S$ | The invariant network of source domain |
| $G_T$ | The ground-truth invariant network of target domain |
| $\overline{G}_T$ | The estimated invariant network of target domain |
| $\hat{G}_T$ | The partial incomplete invariant network of target domain |
| $\hat{G}_S$ | A sub-network of $G_S$, which has the same entity set as $\hat{G}_T$ |
| $\tilde{G}_T$ | The target domain invariant network after entity estimation |
| $\tilde{G}_S$ | The sub-network of $G_S$, which, has the same entity set as $\tilde{G}_T$ |
| $A_T, \hat{A}_S$ | The adjacent matrix of $\hat{G}_T, \hat{G}_S$, respectively |
| $\tilde{A}_T, \tilde{A}_S$ | The adjacent matrix of $\tilde{G}_T, \tilde{G}_S$, respectively |
| $n_S$ | The number of entities in $\hat{G}_S$ |
| $u_S$ | The vector representation of entities in source domain |
| $u_T$ | The vector representation of entities in target domain |
| P | A set of meta-paths |
| W | The weight for each meta-path in P |
| $F(G_1, G_2)$ | The dynamic factor between $G_1$ and $G_2$ |
| $\Omega(\cdot)$ | The regularization term |
| $\lambda, \mu$ | The parameters $0 < \mu < 1$, $0 < \lambda < 1$ |

Figure 9:
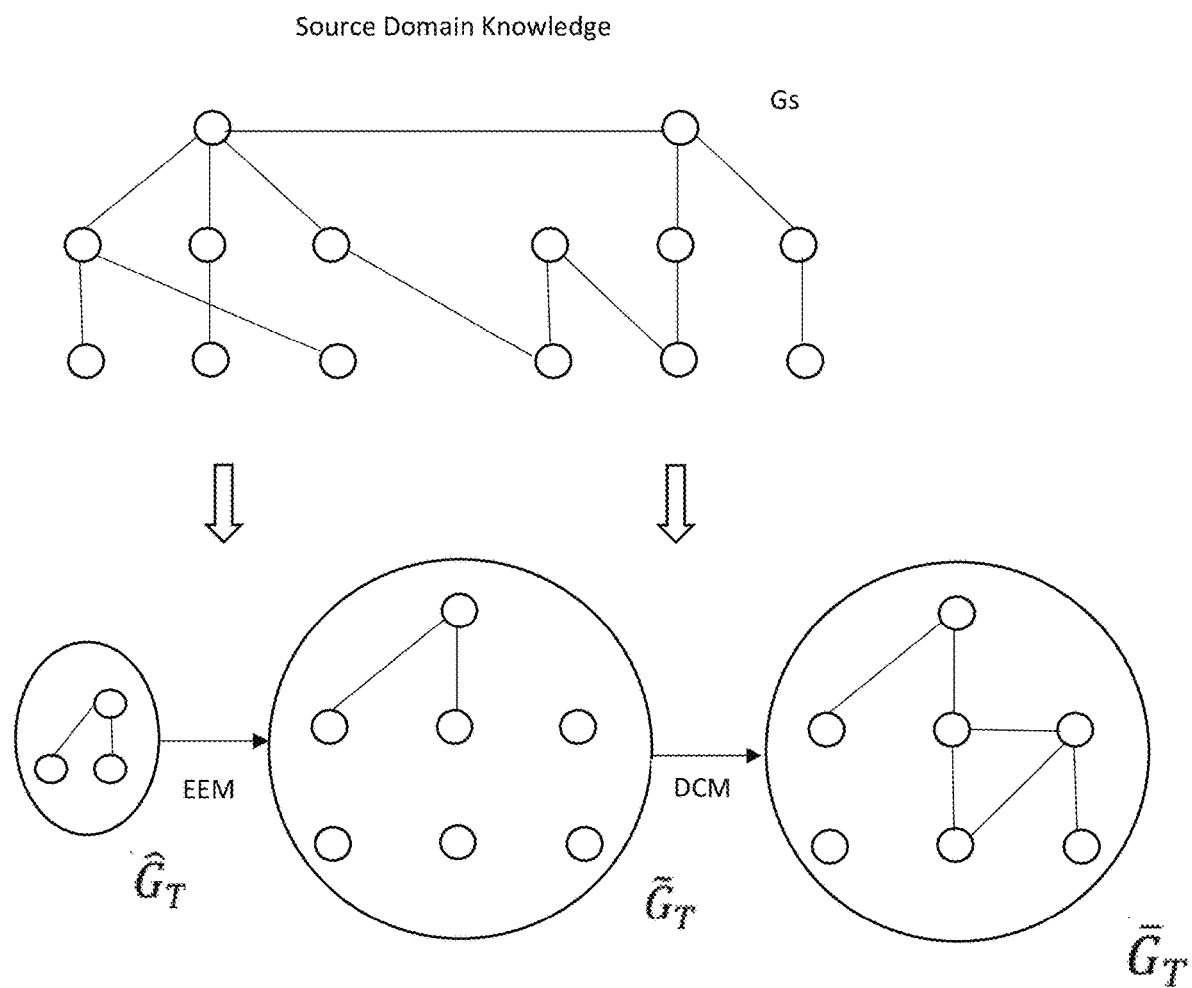
FIG. 9 is a block/flow diagram illustrating an overview of the TINET model including two sub-models (entity estimation model and dependency construction model), in accordance with embodiments of the present invention.

To address the two key challenges introduced above, the exemplary embodiments introduce a knowledge transfer algorithm with two sub-models: EEM (Entity Estimation Model) and DCM (Dependency Construction Model) as illustrated in FIG. 9.

These two sub-models are first introduced separately in detail and then the whole algorithm is analyzed including the parameters and complexity.

For the first sub-model, Entity Estimation Model, the goal is to filter out the entities in the source network Gs that are irrelevant to the target domain. To achieve this, there are two main challenges that need to be dealt with: (1) the lack of intrinsic correlation measures among heterogeneous entities and (2) heterogeneous relations among different entities in the invariant network.

Objective Function. To overcome the lack of intrinsic correlation measures among heterogeneous entities, entities are embedded into a common latent space, where their semantics can be preserved. More specifically, each entity, such as a user, or a process in computer systems, is represented as a d-dimensional vector and can be automatically learned from the data. In the embedding space, the correlation of entities can be naturally computed by distance/similarity measures in the space, such as Euclidean distances, vector dot product, and so on. Compared with other distance/similarity metrics defined on sets, such as Jaccard similarity, the embedding method is more flexible and it has properties such as transitivity.

To address the challenge of heterogeneous relations among different entities, a meta-path is used to model the heterogeneous relations. A meta-path is a path that connects entity types (labels) via a sequence of relations over a heterogeneous network. For example, in a computer system, a meta-path can be a "Process-File-Process", or a "File-Process-Internet Socket". "Process-File-Process" denotes the relationship of two processes load the same file, and "File-Process-Internet Socket" denotes the relationship of a file loaded by a process who opened an Internet Socket. Notice that the potential meta-paths induced from the heterogeneous network Gs can be infinite, but not every single one is relevant and useful for the specific task of interest. Fortunately, there are some algorithms introduced recently for automatically selecting the meta-paths for specific tasks.

Given a set of meta-paths $P=\{p1, p2, \ldots\}$, where $p_i$ denotes the i-th meta-path and let |P| be the number of metapaths. A user can construct |P| graphs $Gp_i$ by each time only extracting the corresponding meta-path $p_i$ from the invariant network. Let $u_S$ be the vector representation of the entities in $G_S$. Then, the method can model the relationship between two entities using their vector representations $u_S(i)$ and $u_S(j)$: $\|u_S(i) - u_S(j)\|_F^2 \approx S_G(i,j)$, where $S_G$ is a weighted average of all the similarity matrices $S_{p_i}$: $S_G = \sum_{i=1}^{|P|} w_i S_{p_i}$, where wi's are non-negative coefficients, and Spi is the similarity matrix constructed by calculating the pairwise shortest path between every two entities in $Ap_i$. $Ap_i$ is the adjacent matrix of the invariant network $Gp_i$. By using the shortest path in the graph, the method can capture the long-term relationship between different entities. Then, the objective function of the EEM model can be defined as:

$$\mathcal{L}_1^{(u_S, W)} = \sum_{i,j}^n (\|u_S(i) - u_S(j)\|_F^2 - S_G)^\theta + \Omega(u_S, W), \quad (1)$$

where $W=\{w1, w2, \ldots, w|P|\}$, and $\Omega(u_S,W)=\lambda\|u_S\|+\lambda\|W\|$ is the generalization term, which prevents the model from over-fitting. And $\lambda$ is the trade-off factor of the generalization term. In practice, the method can choose $\theta$ as 1 or 2, which bears the resemblance to Hamming distance and Euclidean distance, respectively.

This results in:

$$\mathcal{L}_1^{(u_S, W)} = \sum_{i,j}^n (\|u_S(i) - u_S(j)\|_F^2 - S_G)^\theta + \Omega(u_S, W) \quad (2)$$
$$= \sum_{i,j}^n \left(\|u_S(i) - u_S(j)\|_F^2 - \sum_{i=0}^{|P|-1} w_i S_{p_i}\right)^\theta + \lambda\|u_S\| + \lambda\|W\|.$$

Then, the optimized value $\{u_S W\}^{opt}$ can be obtained by:

$$\{u_S, W\}^{opt} = \underset{u_S, W}{\operatorname{argmin}} \mathcal{L}_1^{(u_S, W)}.$$

The objective function in Eq. 2 includes two sets of parameters: (1) $u_S$ and (2) W. Then, the method proposes a two-step iterative process for optimizing $\mathcal{L}_1^{(u_S, W)}$, where the entity vector matrix $u_S$ and the weight vector W for meta-paths mutually enhance each other. In the first step, the method fixes the weight vectors W and learns the best entity vector matrix $u_S$. In the second step, the method fixes the entity vector matrix $u_S$ and learns the best weight vector W. Note that, based on the empirical experience, $\theta=2$.

Fix W and learn $u_S$: When W is fixed, then the problem is reduced to $\|u_S(i) - u_S(j)\|_F^2 \approx S_G(i,j)$, where $S_G$ is a constant similarity matrix. Then, the optimization process becomes a traditional manifold learning problem. Fortunately, the method can have a closed form to solve this problem, via the multi-dimensional scaling technique. More specifically, to obtain such an embedding, the method computes the eigenvalue decomposition of the following matrix: $-\frac{1}{2}$ $HS_GH=U\Lambda U$, where H is the double centering matrix, U has columns as the eigenvectors and $\Lambda$ is a diagonal matrix with eigenvalues.

Then, $u_S$ can be computed as:

$$u_S = U\sqrt[2]{\Lambda}. \qquad (3)$$

Fix $u_S$ and learn W: When fixing $u_S$, the problem is reduced to:

$$\mathcal{L}_1^W = \sum_{i,j}^n \left( \|u_S(i) - u_S(j)\|_F^2 - \sum_{i=1}^{|P|} w_i S_{p_i} \right)^\theta + \lambda\|u_S\| + \lambda\|W\| \qquad (4)$$

$$= \sum_{i,j}^n \left( C_1 - \sum_{i=0}^{|P|} w_i S_{p_i} \right)^\theta + \lambda\|W\| + C_2.$$

where $C_1 = \|u_S(i)-u_S(j)\|_F^2$ is a constant matrix, and $C_2 = \lambda\|ES\|$ is a constant. Then, this function becomes a linear regression.

So, the method also has the close form solution for W: $W = (S_G^T S_G)^{-1} S_G C_1$.

After the method obtains the embedding vectors $u_S$, then the relevance matrix $\mathbb{R}$ between different entities can be obtained as $\mathbb{R} = u_S u_S^T$. The method can use a user-defined threshold to select the entities with high correlation with target domain for transferring. But this thresholding scheme often suffers for the lack of domain knowledge. The method thus introduces a hypothesis test for automatically thresholding the selection of the entities.

For each entity $\hat{G}_T$, in the method first normalizes all the scores by: $\mathbb{R}(i,:)_{norm} = \mathbb{R}(i,:)-\mu/\delta$, where $\mu = \overline{\mathbb{R}(i,:)}$ is the average value of $\mathbb{R}(i,:)$ and $\delta$ is the standard deviation of $\mathbb{R}(i,:)$. This standardized scores can be approximated with a Gaussian distribution. Then, the threshold will be 1.96 for P=0.025 (or 2.58 for P=0.001). By using this threshold, the method can filter out all the statistically irrelevant entities from the source domain, and transfer highly correlated entities to the target domain.

By combining the transferred entities and the original incomplete target network $\hat{G}_T$, the method obtains $\tilde{G}_T$, a network that contains all the transferred entities, but missing the dependencies among them. Then, the next step is to construct the missing dependencies in $\tilde{G}_T$.

Dependency Construction Model

To construct the missing dependencies/invariants in $\tilde{G}_T$, there are two constraints need to be considered:

Smoothness Constraint: The predicted dependency structure in $\tilde{G}_T$ needs to be close to the dependency structure of the original incomplete target network $\hat{G}_T$. The intuition behind this constraint is that the learned dependencies should keep the original dependencies of $\hat{G}_T$ as intact as possible. This constraint guarantees that the constructed dependencies follow the behaviors of the target domain.

Consistency Constraint: The inconsistency between $\tilde{G}_T$ and $\tilde{G}_S$ should be similar to the inconsistency between $\hat{G}_T$ and $\hat{G}_S$. Here, $\tilde{G}_T$ and $\tilde{G}_S$ are the sub-graphs of Gs, which have the same entity set with $\tilde{G}_T$ and $\tilde{G}_S$, respectively. This constraint guarantees that the target network learned by the model can keep the original domain difference with the source network.

Before the above two constraints are modeled, the method first needs a measure to evaluate the inconsistency between different domains. As aforementioned, invariant networks are normal profiles of their corresponding domains. So, the method employs the distance between different invariant networks to denote the domain inconsistency.

A novel metric is thus introduced, named dynamic factor $F(\tilde{G}_S, \tilde{G}_T)$ between two invariant networks $\tilde{G}_S$ and $\tilde{G}_T$ from two different domains as:

$$F(\tilde{G}_S, \tilde{G}_T) = \frac{\|\tilde{A}_S - \tilde{A}_T\|}{|\tilde{G}_S| * (|\tilde{G}_S|-1)/2} = \frac{2\|\tilde{A}_S - \tilde{A}_T\|}{n_S(n_S-1)}, \qquad (5)$$

where $n_S = |\tilde{G}_S|$ is the number of entities in $\tilde{G}_S$, $\tilde{A}_S$ and $\tilde{A}_T$ denote the adjacent matrix of $\tilde{G}_S$ and $\tilde{G}_T$, respectively, and $n_S(n_S-1)/2$ denotes the number of edges of a fully connected graph with $n_S$ entities.

Dependency Construction Model: Modeling Smoothness Constraint.

The smoothness constraint is modeled as follows:

$$\mathcal{L}_{2,1}^{u_T} = \left\| \sum_{i=1}^{n_S} \sum_{j=0}^{n_S-1} \left( u_T(i) u_T(j)^T - \tilde{A}_T(i,j) \right) \right\|_F^2 + \lambda\|u_T\| \qquad (6)$$

$$= \|u_T u_T^T - \tilde{A}_T\|_F^2 + \Omega(u_T),$$

where $u_T$ is the vector representation of the entities in $\tilde{G}_T$, and $\Omega(u_T) = \lambda\|u_T\|$ is the regularization term.

Modeling Consistency Constraint.

The consistency constraint is then modeled as follows:

$$\mathcal{L}_{2,2}^{(u_T)} = \|F(u_T u_T^T, \tilde{A}_S) - F(\hat{A}_S, \hat{A}_T)\|_F^2 + \Omega(u_T), \qquad (7)$$

where $F(*, *)$ is the dynamic factor.

Then, putting Eq. 5 and $\Omega(u_T)$ into Eq. 7, the following is obtained:

$$\mathcal{L}_{2,2}^{E_T} = \|F(u_T u_T^T, \tilde{G}_S) - F(\hat{G}_S, \hat{G}_T)\|_F^2 + \Omega(u_T) \qquad (8)$$

$$= \left\| \frac{2\|u_T u_T^T - \tilde{A}_S\|}{n_S(n_S-1)} - F(\hat{G}_S, \hat{G}_T) \right\|_F^2 + \Omega(u_T)$$

$$= \left\| \frac{2\|u_T u_T^T - \tilde{A}_S\|}{n_S(n_S-1)} - C_3 \right\|_F^2 + \Omega(u_T),$$

where $C_3 = F(\hat{G}_S, \hat{G}_T)$.

Unified Model. By putting the two constraints together, the unified model for dependency construction is as follows:

$$\mathcal{L}_2^{u_T} = \mu \mathcal{L}_{2,1}^{u_T} + (1-\mu)\mathcal{L}_{2,2}^{u_T} \qquad (9)$$

$$= \mu\|u_T u_T^T - \tilde{A}_T\|_F^2 + (1-\mu)\left\| \frac{2\|u_T u_T^T - \tilde{A}_S\|}{n_S(n_S-1)} - C_3 \right\|_F^2 + \Omega(u_T)$$

| Algorithm 1: The TINET Algorithm |
| --- |
| Input: $G_S$, $\hat{G}_T$ |
| Output: $\tilde{G}_T$ |
| 1  Select a set of meta-paths from $G_S$.; |
| 2  Extract \|P\| networks from $G_S$; |
| 3  Calculate all the similarity matrix $S_{pi}$; |

-continued

Algorithm 1: The TINET Algorithm

| | |
|---|---|
| 4 | \* Entity Estimation Process as introduced in Section 3.1*\; |
| 5 | while Convergence do |
| 6 |    Calculate U and Λ; |
| 7 |    $u_S = U \cdot \sqrt[2]{\Lambda}$; |
| 8 |    Calculate $S_G$ and $C_1$; |
| 9 |    $W = (S_G^T S_G)^{-1} S_G C_1$; |
| 10 | end |
| 11 | Construct $\overline{G}_T$; |
| 12 | \* Dependency Construction Process as introduced in Section 3.2*\; |
| 13 | while Convergence do |
| 14 |    Update $u_T$ using the gradient of Eq. 10; |
| 15 | end |
| 16 | Construct $\overline{G}_T$; |

The first term of the model incorporates the smoothness constraint component, which keeps the $u_T$ closer to the target domain knowledge existed in $\tilde{G}_S$. The second term considers the consistency constraint, that is the inconsistency between $\tilde{G}_T$ and $\tilde{G}_S$ should be similar to the inconsistency between $\hat{G}_T$ and $\hat{G}_S$. μ and λ are important parameters, which capture the importance of each term.

To optimize the model as in Eq. 9, a stochastic gradient descent method is employed.

The derivative on $u_T$ is given as:

$$\frac{1}{2}\frac{\partial \mathcal{L}_2^{u_T}}{\partial E_T} = \mu u_T(u_T u_T^T - \tilde{A}_T) + (1-\mu)u_T \left\| \frac{2\|u_T u_T^T - \tilde{A}_S\|}{n_S(n_S-1)} - C_3 \right\| + u_T \quad (10)$$

The overall algorithm is then summarized as Algorithm 1. In the algorithm, line 5 to line 11 implements the Entity Estimation Model, and lines 13 to 16 implements the Dependency Construction Model.

Regarding parameter setting, there are two parameters, λ and μ, in the model. For λ, it is always assigned manually based on the experiments and experience. For μ, when a large number of entities are transferred to the target domain, a large μ can improve the transferring result, because more information is needed to be added from the source domain. On the other hand, when only a small number of entities are transferred to the target domain, then a larger μ will bias the result. Therefore, the value of μ depends on how many entities are transferred from the source domain to the target domain.

In this sense, the proportion of the transferred entities in $\tilde{G}_T$ can be used to calculate μ. Given the entity size of $\tilde{G}_T$ as $|\tilde{G}_T|$ the entity size of $\hat{G}_T$ as $|\hat{G}_T|$, then μ can be calculated as:

$$\mu = (|\tilde{G}_T| - |\hat{G}_T|)/|\tilde{G}_T|. \quad (11)$$

Regarding complexity analysis, as shown in Algorithm 1, the time for learning the model is dominated by computing the objective functions and their corresponding gradients against feature vectors. For the Entity Estimation Model (EEM), the time complexity of computing the $u_S$ in Eq. 3 is bounded by $O(d_1 n)$, where n is the number of entities in $G_S$, and $d_1$ is the dimension of the vector space of $u_S$. The time complexity for computing W is also bounded by $O(d_1 n)$. So, suppose the number of training iterations for EEM is $t_1$, then the overall complexity of EEM model is $O(t_1 d_1 n)$. For the Dependency Construction Model (DCM), the time complexity of computing the gradients of $L_2$ against $u_T$ is $O(t_2 d_2 n)$, where $t_2$ is the number of iterations and $d_2$ is the dimensionality of feature vector. $t_1$, $t_2$, $d_1$, and $d_2$ are all small numbers, so the method can regard them as a constant, say C. Thus, the overall complexity of the method is $O(C_m)$, which is linear with the size of the entity set. This makes the above algorithm practicable for large-scale datasets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for implementing a knowledge transfer based model for accelerating invariant network learning, the method comprising:
    generating an invariant network from data streams, the invariant network representing an enterprise information network including a plurality of nodes representing entities;
    employing a multi-relational based entity estimation model for transferring the entities from a source domain graph to a target domain graph by filtering irrelevant entities from the source domain graph;
    employing a reference construction model for determining differences between the source and target domain graphs, and constructing unbiased dependencies between the entities to generate a target invariant network; and
    outputting the generated target invariant network on a user interface of a computing device.

2. The method of claim 1, wherein the multi-relational based entity estimation model employs an embedding based framework to calculate relevance between pairs of the entities.

3. The method of claim 2, wherein all the entities are represented in vector space.

4. The method of claim 3, wherein an undirected correlation between the entities is determined in the vector space.

5. The method of claim 4, wherein an inference technique is employed to model an optimization process as a manifold learning problem.

6. The method of claim 1, wherein the reference construction model employs a first function to model a consistency constraint between the source and target domain graphs.

7. The method of claim 6, wherein a second function is employed to model a smoothness constraint between a predicted invariant network and an original invariant network.

8. The method of claim 7, wherein a unified model combines the consistency constraint and the smoothness constraint.

9. A system for implementing a knowledge transfer based model for accelerating invariant network learning, the system comprising:
    a memory; and
    a processor in communication with the memory, wherein the processor is configured to:
        generate an invariant network from data streams, the invariant network representing an enterprise information network including a plurality of nodes representing entities;
        employ a multi-relational based entity estimation model for transferring the entities from a source domain graph to a target domain graph by filtering irrelevant entities from the source domain graph;
        employ a reference construction model for determining differences between the source and target domain graphs, and construct unbiased dependencies between the entities to generate a target invariant network; and output the generated target invariant network on a user interface of a computing device.

10. The system of claim 9, wherein the multi-relational based entity estimation model employs an embedding based framework to calculate relevance between pairs of the entities.

11. The system of claim 10, wherein all the entities are represented in vector space.

12. The system of claim 11, wherein an undirected correlation between the entities is determined in the vector space.

13. The system of claim 12, wherein an inference technique is employed to model an optimization process as a manifold learning problem.

14. The system of claim 9, wherein the reference construction model employs a first function to model a consistency constraint between the source and target domain graphs.

15. The system of claim 14, wherein a second function is employed to model a smoothness constraint between a predicted invariant network and an original invariant network.

16. The system of claim 15, wherein a unified model combines the consistency constraint and the smoothness constraint.

17. A non-transitory computer-readable storage medium comprising a computer-readable program for implementing a knowledge transfer based model for accelerating invariant network learning, wherein the computer-readable program when executed on a computer causes the computer to perform the steps of:

generating an invariant network from data streams, the invariant network representing an enterprise information network including a plurality of nodes representing entities;

employing a multi-relational based entity estimation model for transferring the entities from a source domain graph to a target domain graph by filtering irrelevant entities from the source domain graph;

employing a reference construction model for determining differences between the source and target domain graphs, and constructing unbiased dependencies between the entities to generate a target invariant network; and outputting the generated target invariant network on a user interface of a computing device.

18. The non-transitory computer-readable storage medium of claim 17, wherein the multi-relational based entity estimation model employs an embedding based framework to calculate relevance between pairs of the entities.

19. The non-transitory computer-readable storage medium of claim 18, wherein all the entities are represented in vector space.

20. The non-transitory computer-readable storage medium of claim 19,
wherein an undirected correlation between the entities is determined in the vector space; and
wherein an inference technique is employed to model an optimization process as a manifold learning problem.

* * * * *